United States Patent
Simske et al.

(10) Patent No.: US 8,532,330 B2
(45) Date of Patent: Sep. 10, 2013

(54) SECURITY PRINTING ANALYSIS SYSTEM AND METHOD FOR ENHANCING SECURITY PRINTING

(75) Inventors: Steven J. Simske, Fort Collins, CO (US); Malgorzala M. Sturgill, Fort Collins, CO (US); John S. Dunfield, Corvallis, OR (US); Paul S. Everest, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 173 days.

(21) Appl. No.: 12/992,874

(22) PCT Filed: May 22, 2008

(86) PCT No.: PCT/US2008/064583
§ 371 (c)(1),
(2), (4) Date: Jan. 31, 2011

(87) PCT Pub. No.: WO2009/142640
PCT Pub. Date: Nov. 26, 2009

(65) Prior Publication Data
US 2011/0116681 A1    May 19, 2011

(51) Int. Cl.
*G06K 9/00* (2006.01)
(52) U.S. Cl.
USPC ........................................... 382/100
(58) Field of Classification Search
USPC ............... 382/100, 232–253; 380/200–242; 358/3.28, 426.01–426.16; 348/384.1–440.1; 375/122, 240.01–240.29
See application file for complete search history.

(56) References Cited

U.S. PATENT DOCUMENTS

| | | |
|---|---|---|
| 5,917,996 A | 6/1999 | Thorpe |
| 6,922,480 B2 | 7/2005 | Rhoads |
| 2004/0153649 A1 | 8/2004 | Rhoads |
| 2004/0199778 A1 | 10/2004 | Wernet et al. |
| 2007/0201720 A1 | 8/2007 | Rodriguez et al. |
| 2008/0112615 A1 | 5/2008 | Obrea et al. |
| 2008/0181447 A1* | 7/2008 | Adams et al. ............ 382/100 |

FOREIGN PATENT DOCUMENTS

| | | |
|---|---|---|
| CN | 1504947 A | 6/2004 |
| CN | 1710577 A | 12/2005 |
| WO | WO-2007145483 A1 | 12/2007 |

OTHER PUBLICATIONS

Examination Report, Application No. GB 1021110.0, Date of Mailing: Oct. 16, 2012, pp. 1-4.
Office Action, Application No. CN 200880130476.X, Date of Mailing: Oct. 16, 2012, pp. 1-7.
S Huang, et al, Optical Watermarking for Printed document Authhernication, IEEE Trans. on Information Forensics and Security, vol. 2, No. 2, Jun. 2007.
German Office Action, German Application No. 112008003871.6 Date of Mailing: Oct. 10, 2011, pp. 1-6, English Translation: pp. 1-3.

(Continued)

*Primary Examiner* — Atiba O Fitzpatrick

(57) ABSTRACT

A method for enhancing security printing includes generating data for a region of interest (14), where the data includes information for at least one of locating or analyzing the region of interest (14) using a secure registry (18). The method further includes encrypting a deterrent (12) with the data, and printing the deterrent (12) and the region of interest (14) on an object (10).

12 Claims, 3 Drawing Sheets

(56) References Cited

OTHER PUBLICATIONS

International Preliminary Report on Patentability, International Application No. PCT/US2008/064583, Date of Mailing: Dec. 2, 2010, pp. 1-7.

International Search Report and Written Opinion, International Application No. PCT/US2008/064583, Date of Mailing: Feb. 12, 2009, pp. 1-14.

* cited by examiner

SECURITY PRINTING ANALYSIS SYSTEM AND METHOD FOR ENHANCING SECURITY PRINTING

BACKGROUND

The present disclosure relates generally to a security printing analysis system and to a method for enhancing security printing.

Security packaging is an important component of product tracking and authenticating, as well as of anti-counterfeiting initiatives. Security packaging involves providing each package with a unique ID, in the form of, for example, a deterrent or mark. Some current identifying/authenticating techniques incorporate the analysis of a digital image of the unique ID. However, such techniques may be deleteriously impacted by the fact that the authentication systems used are configured for analysis of a single type of ID. Furthermore, such systems may not be designed for accommodating imprecise digital images. As such, a user would generally need pre-knowledge of the exact location of the unique ID on the package in order to transmit an image that includes the unique ID to be analyzed. In an effort to assist the user in finding the unique ID, marks (e.g., fiducial marks) identifying suitable scan positions or identifying the location of the ID have been included on the package. Such static IDs and placement thereof may potentially lead to undesirable, facile detection and reproduction of the mark(s) by potential counterfeiters.

BRIEF DESCRIPTION OF THE DRAWINGS

Features and advantages of embodiments of the present disclosure will become apparent by reference to the following detailed description and drawings, in which like reference numerals correspond to the same or similar, though perhaps not identical, components. For the sake of brevity, reference numerals having a previously described function may or may not be described in connection with subsequent drawings in which they appear.

DETAILED DESCRIPTION

Embodiment(s) of the method and system disclosed herein utilize a unique identifier or nonce that is printed on an object as a look-up for identifying and/or analyzing a particular region of interest also printed on the object. The specific region(s) of interest is/are then used to disambiguate authentic and counterfeit printed surfaces. The method and system advantageously link elements in the security variable data printing (e.g., deterrents) to regions of interest to be analyzed by, for example, an image based forensic service (IBFS).

Figure 1:
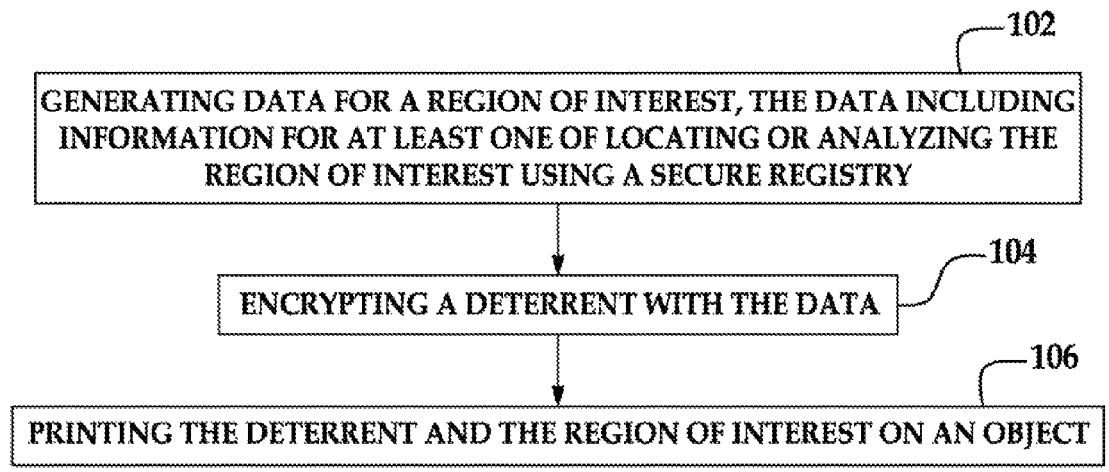
FIG. 1 is a schematic flow diagram depicting an embodiment of a method for enhancing security printing.
Figure 3:
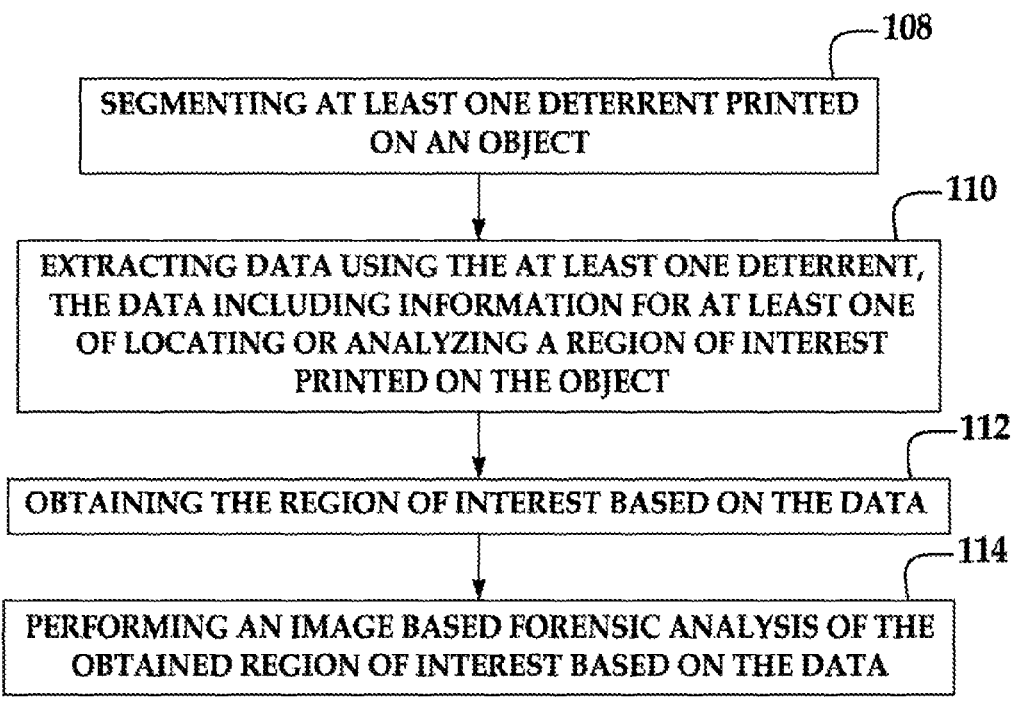
FIG. 3 is a schematic flow diagram depicting an embodiment of a security printing analysis method.
Figure 4:
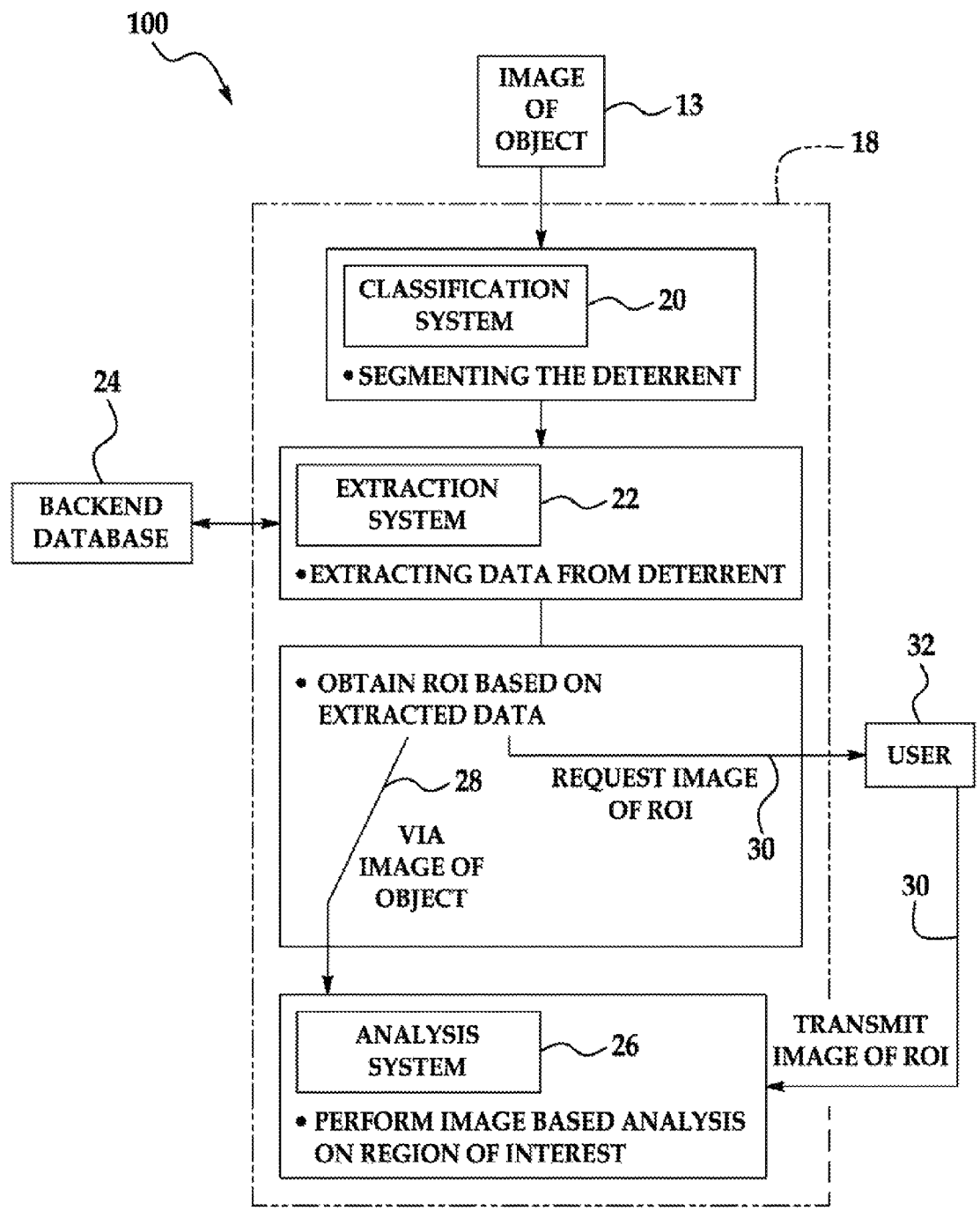
FIG. 4 is a schematic diagram of an embodiment of a security printing analysis system and a method utilizing the same.

An embodiment of a method for enhancing security printing is shown in FIG. 1, and an embodiment of a method for analyzing an object that has been subjected to the security printing method of FIG. 1 is shown in FIGS. 3 and 4. Embodiment(s) of the system for performing such methods is disclosed and discussed with each of the Figures.

The embodiment of the method for enhancing security printing, as depicted in FIG. 1, includes generating data for a region of interest (ROI), as shown at reference numeral 102; encrypting a deterrent with the data, as shown at reference numeral 104; and printing the deterrent and the region of interest on an object, as shown at reference numeral 106.

Figure 2A:
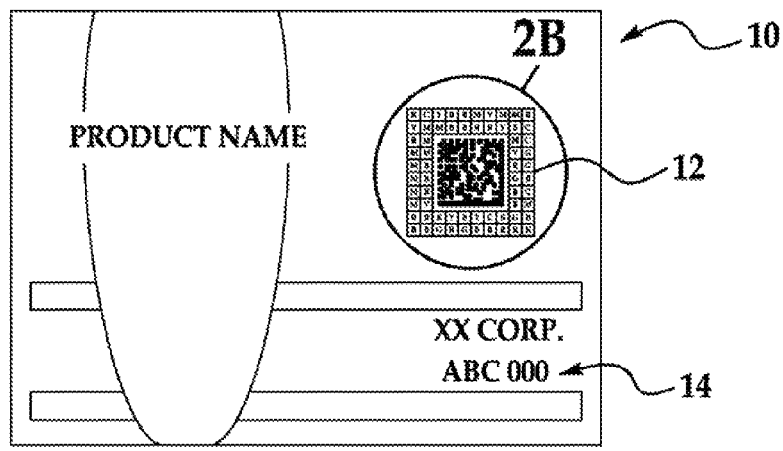
FIG. 2A is a semi-schematic diagram of an embodiment of an object having a deterrent and a region of interest printed thereon.
Figure 2B:
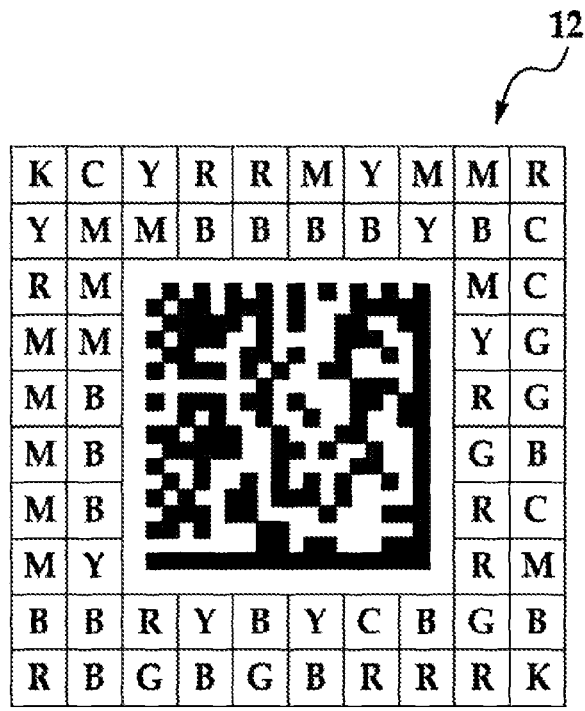
FIG. 2B is an enlarged view of the deterrent shown in FIG. 2A.

An object 10 that may be used in the methods disclosed herein is shown in FIG. 2A. It is to be understood that the term "object" as used herein is to be interpreted broadly and may include, but is not limited to any type of object, product, document or package. Likewise, the term "package" is to be interpreted broadly herein to include any unit for containing a product, displaying a product, or otherwise identifying a branded good. Non-limitative examples of such packages include labels, anti-tamper strips (which tear when removal is attempted, thereby damaging both visual and physical aspects of the deterrent 12), boxes, bags, containers, clamshells, bands, tape, wraps, ties, bottles, vials, dispensers, inserts, other documents, or the like, or combinations thereof.

As shown in FIG. 2A, the object 10 has both the deterrent 12 and the region of interest 14 printed thereon. In some instances, the deterrent 12 and region of interest 14 are separate indicia (as shown in FIG. 2A), and in other instances, it may be desirable to include the deterrent 12 and the region of interest 14 in the same indicia. Any desirable graphical or alphanumeric indicia/glyph may be included in the region of interest 14, and the region of interest 14 may be located at any desirable position on the object 10. The deterrent 12 may be any variable indicia, and the deterrent 12 may also be located at any desirable position on the object 10. Non-limiting examples of suitable deterrents 12 include color lines, fingerprints, color text, copy detection patterns (CDP), color tiles, letter sequences, number sequences, graphic sequences, target patterns, bar codes, a guilloche, planchettes, holographs, security threads, watermarks, anti-tamper deterrents, or other relevant deterrents known to those skilled in the art, or combinations thereof.

The data that is generated for the region of interest 14 generally includes information regarding the location of the region of interest 14 on the object 10 and/or how to analyze the region of interest 14. More specifically, the generated data may include region of interest data, scan settings, imaging settings, secure registry settings, job settings, or combinations thereof.

Non-limiting examples of the region of interest data include the location ($x_{min}$, $x_{max}$; $y_{min}$, and $y_{max}$) of the region of interest 14, the dimension ($\Delta x$, $\Delta y$) of the region of interest 14, and/or glyph specification data. It is to be understood that the location may be an absolute measurement in some distance metric (e.g., cm) from a layout boundary or from an implicit or explicit fiducial mark on the object 10. The glyph specification data is generally information indicating any color(s), graphical indicia and/or alphanumeric indicia that are included in the region of interest 14.

The scan settings of the region of interest 14 that may be included in the generated data include bit depth, resolution, quality settings, color settings (e.g., color space, channels used, paletted or unpaletted, color balance, etc.) or the like, or combinations thereof.

The imaging settings may include any processes to be performed on the region of interest 14 after scanning, including cropping, restoration (deconvolution to remove blurring, noise removal, sharpening, snapping of text, brightness/exposure/contrast adjustment, color transformations, or the like), scaling/downsampling, or the like, or combinations thereof. It is to be understood that specific information about the printing (e.g., half-toning specifications and other print job specifications, including ink/substrate information if salient) of the region of interest 14 may also be represented.

Any secure registry settings that enable the image based forensic analysis to be enhanced may also be included in the data. A secure registry 18 (shown in FIG. 3) includes a classification system 20, an extraction system 22 (which may include a backend database 24 (i.e., a remotely/securely accessible database not necessarily located at or near the site of authentication that may be accessed via https, ipsec, etc.)), and an image based forensic analysis system 26. As discussed further hereinbelow, the secure registry 18 is used to analyze images of the deterrent 12 and region of interest 14. Secure registry settings include, but are not limited to statistical p-values, call switches, or the like, or combinations thereof. Such settings may be particular to the secure registry 18, and may include a set of metrics used to evaluate a particular image, an aggregation strategy (for assessing real versus counterfeit deterrents 12, aggregating counterfeit samples, etc.), workflow for aggregation, or the like, or combinations thereof.

Specific job settings may also be included in the data that is generated for the region of interest 14. Examples of job settings include security codes or other identifiers associated with the region(s) of interest 14. These identifiers may be used to control the settings of the image based forensic service, deciding, for example, the set of image features to be analyzed and compared across samples.

The data that is generated for the region of interest 14 is then encrypted in, encoded in or is otherwise associated with the deterrent 12. As such, the data is often one or more payloads (e.g., any number of bits that make up part of a tacit (published) deterrent) of the security deterrent 12. It is to be understood that any desirable encryption or encoding scheme may be used in the embodiments disclosed herein.

The respective data (e.g., region of interest data and the various settings) may be individually indicated by any number of bits. As a non-limiting example, a deterrent 12 may include 512×512 pixels. The location (x, y) and dimension ($\Delta x$, $\Delta y$) of the ROI can be represented by 10+10+9+9=38 bits. Since $512=2^9$, 10 bits are used to represent the starting point from 0-512. It is to be understood that if 512 pixels are used, then there is no ROI 14, and therefore the 10th bit for (x, y) is effectively a status or on/off bit, indicating that there is no ROI 14. In this example, since the maximum size is 512, and minimum size is 1, 9 bits represent $\Delta x$, $\Delta y$, since $2^9=512$. If, in this example, each of the following scan settings—bit depth, resolution, exposure, color space/palette, color correction—may be set to one of four settings, then these five scanner settings can be represented by 10 bits (since $2^2=4$, two bits are used to represent one of the four settings for each of the five scanner settings). By the same argument, if each of the following imaging settings—cropping, deblurring, noise removal, sharpening, snapping, brightness, exposure, contrast, color transformation and scaling/downsampling—may be set to one of four settings, then these ten imaging settings can be represented by 20 bits. Still further, printing-specific information (such as halftone specifications, print job specifications, etc.) may be specified by another, for example, 4 bits each (16 independent settings, indicated by 0000, 0001, 0010, 0011 . . . 1111 for the four bits, for example). If 6 different settings are useful, then 24 bits may be used. Finally, the secure registry settings may include a relatively large number (e.g., 420) of image metrics, which would require 420 bits. However, a set of metric families (indicative of the image metrics used) may be specified by 20 bits (e.g., there are $2^{20}$, or just over 1 million, different families of metrics to select from). If all of these settings are specified together, as many as 512 bits of information (38+10+20+24+420) may be encoded/encrypted in the deterrent 12. If the metrics are represented as families (20 bits total), 112 bits are encoded/encrypted in the deterrent 12 (38+10+20+24+20).

If the data is otherwise associated with the deterrent 12, generally the data is linked to the deterrent 12 via other information, stored in the backend database 24, and recovered when the deterrent 12 is transmitted to the secure registry 18. In this embodiment, the deterrent 12 may include other information that enables a user to retrieve the desirable location and/or analysis data from the backend database 24. As such, the deterrent 12 may be a unique ID, or lookup sequence, for any relevant data/metadata/instructions/etc. stored regarding the creation, deployment, tracking, etc. of the image.

It is to be understood that in some embodiments, some of the salient information/data may be encoded in the security deterrent 12, while the remaining salient information/data may be accessed via the secure database 24.

Once the data is generated, the deterrent 12 and the region of interest 14 are printed on the object 10 at the desirable location(s). The deterrent 12 and the region of interest 14 may be printed on the object 10 using any suitable technique, including, but not limited to inkjet printing, dry or liquid electrophotography, or other suitable variable data printing techniques. It is to be understood that printing may be independent of the analysis of the region of interest 14. As such, the printing service used may be a separate entity from the secure registry 18. This allows mass serialization or other methods to be used for randomizing the deterrent 12 to coexist with the secure registry 18. Furthermore, utilizing a printing service that is distinct from the secure registry 18 allows the number of bits available in the deterrent 12 to be different than the number of bits actually used for the data, in part because the secure registry 18 stores all of the information, and the printing service does not have to be privy to such information. It is to be understood that because the bits serve as a look-up sequence, there is no limitation on the amount of information associated with them in the back-end registry 18. It is to be further understood that the printing service and the secure registry 18 may be the same entity, and in such embodiments, it may be desirable to encode/encrypt all of the data in the deterrent 12.

Referring now to FIG. 3, an embodiment of a security printing analysis method is depicted. Generally, the method includes segmenting at least one deterrent printed on an object, as shown at reference numeral 108; extracting data using the at least one deterrent, the data including information for at least one of locating or analyzing a region of interest printed on the object, as shown at reference numeral 110; obtaining the region of interest based on the data, as shown at reference numeral 112; and performing an image based forensic analysis of the obtained region of interest based on the data, as shown at reference numeral 114.

Referring now to FIG. 4, an embodiment of the system 100 and a method utilizing the system 100 (similar to the method shown in FIG. 3) is depicted. A digital image 13 of all or a portion of the object 10 (including at least the deterrent 12) is captured using an electronic device. The electronic device may be a digital camera. It is to be understood that the digital camera may be embodied in, for example, a cellular phone, a personal digital assistant, or the like. Another suitable electronic device is a scanner, an inspection camera, a tabletop imager, or the like.

The digital image 13 of the object 10 is then transmitted from the electronic device to the secure registry 18. As previously mentioned, the secure registry 18 includes the classification system 20, the extraction system 22, and the analysis system 26. Very generally, the classification system 20 identifies different zones or regions from the digital image 13 (at least one of which contains deterrent 12); the extraction system 22 includes software to read and extract any information from deterrent 12; and the analysis system 26 analyzes a region of interest 14 on the object 10 based on the extracted data.

It is to be understood that the systems 20, 22, 26 within the secure registry 18 may be configured as a computer program, an Internet enabled program, or the like. Generally, the various systems 20, 22, 26 are operatively connected or configured so as to function as a single secure registry 18.

Upon receiving the digital image 13, the classification system 20 identifies different zones or regions from the image 13. Classification includes thresholding the image 13, forming zones/regions, and calculating salient features of the regions. The regions are compared to a list of descriptive security deterrents (e.g., stored in the backend database 24), and if a match is made, the region is classified as the deterrent 12. Other non-matching regions that contain indicia may be classified as potential regions of interest. It is to be understood that areas of the image 13 that do not contain the deterrent 12 or any potential regions of interest may be ignored during and after segmentation/classification. In some instances, however, such areas of the image 13 may later be determined to be the regions of interest 14 pointed to by the information in the salient deterrent 12. By dividing up the image 13, the classification system 20 essentially extracts the deterrent 12 from the digital image 13 for further analysis, and identifies areas that may be the region of interest 14.

Once the image 13 is segmented, the extraction system 22 decodes, decrypts or otherwise identifies the data associated with the deterrent 12. The extraction system 22 obtains the bit stream that is encoded, encrypted or otherwise associated with the deterrent 12, thereby enabling the system 100 to determine the location of the region of interest 14 and/or how to analyze the region of interest 14. In some instances, the bit stream does not directly reveal the location and analysis data, rather it provides information that, if authentic, enables the retrieval of the location and analysis data from the backend database 24 (which is storing such data in a record associated with the deterrent 12 and the corresponding region of interest 14). As a non-limiting example, the bit stream may contain retrieval information when the amount of information needed to specify the region of interest 14 is larger than the number of bits in the deterrent 12 set aside for that purpose (e.g., if the region of interest 14 is non-rectangular, polygon vertices will be needed, or if the deterrent 12 has a modest number of spare bits).

Once the bit stream and the corresponding data are revealed, the location information is used to obtain an image of the region of interest 14. It is to be understood that the location information (as previously described) identifies where on the object 10 the region of interest 14 is positioned. The original image 13 sent to the secure registry 18 may include the region of interest 14 (i.e., the deterrent 12 and region of interest 14 are sent together), as shown at path 28. If this is the case, the analysis system 26 may begin the image based analysis of the region 14 after obtaining the data and locating the region of interest 14 in the image 13.

If, however, the original image 13 sent to the secure registry 18 does not include the region of interest 14 (as identified from the extracted data), the secure registry 18 may request a user 32 (e.g., a consumer, retailer and/or inspector attempting to verify the authenticity of the object 10) to capture a digital image of the region of interest 14 and transmit the additional digital image to the secure registry 18, as shown at path 30.

Once the secure registry 18 receives the image of the region of interest 14, the analysis system 26 analyzes the region of interest 14 according to the settings (scanner settings, image settings; etc.) obtained from the data retrieved using the deterrent 12. The settings essentially instruct the analysis system 26 on how to perform the image based analysis of the region of interest 14. It is to be understood however, that the settings may be idiosyncratic to the particular image based forensic service, the workflow, the brand owner, etc. In an embodiment, the image based analysis of the region of interest 14 may be used to authenticate the object 10, or reveal the object 10 as being counterfeit.

The methods and system 100 disclosed herein include, but are not limited to the following advantages. An innately moving target is provided for the regions of interest 14 and the corresponding settings, in part because the deterrent 12 is not tied to any specific data representation (i.e., it is deployed as a look-up). Additionally, there is a wide breadth of choices for how the deterrent 12 is used, for example, it may be the payload for a separate security deterrent (e.g., a mass serialized code), and thus may serve as both a unique ID deterrent and as a look-up. As another example, the deterrent 12 may be a digest/encryption of the settings, and as such, the deterrent 12 is printed with the same security as is associated with performing the image based forensic analysis.

While several embodiments have been described in detail, it will be apparent to those skilled in the art that the disclosed embodiments may be modified. Therefore, the foregoing description is to be considered exemplary rather than limiting.

What is claimed is:

1. A method for enhancing security printing, the method comprising:
    generating data for a region of interest, the data including information for at least one of locating or analyzing the region of interest using a secure registry;
    encrypting, encoding or associating a deterrent with the data; and
    printing the deterrent and the region of interest on an object, wherein the deterrent and the region of interest are separate indicia printed at different locations on the object.

2. The method as defined in claim 1 wherein the data is selected from region of interest data, scan settings, imaging settings, secure registry settings, job settings, and combinations thereof, and wherein the region of interest data includes region of interest location data, region of interest glyph specification data, and combinations thereof.

3. The method as defined in claim 1 wherein after printing, the method further comprises:
    segmenting the deterrent;
    extracting the data using the deterrent;
    obtaining the region of interest based on the extracted data; and
    performing an image based forensic analysis of the obtained region of interest based on the data.

4. The method as defined in claim 3 wherein obtaining the region of interest is accomplished by capturing, via an electronic device, an image of the region of interest, and wherein the method further comprises sending the captured image of the region of interest to the secure registry which performs the image based forensic analysis.

5. The method as defined in claim 3 wherein prior to segmenting, the method further comprises:

capturing the deterrent; and transmitting the captured deterrent to the secure registry, wherein the secure registry is configured to segment the deterrent and extract the data for the region of interest.

6. The method as defined in claim 3 wherein the data is selected from region of interest location data, region of interest glyph specification data, scan settings, imaging settings, secure registry settings, job settings, and combinations thereof.

7. A system for enhancing security printing, the system comprising: a computing device comprising a program stored on a non-transitory computer-readable medium to direct the computing device to:

generate data for a region of interest, the data including information for at least one of locating or analyzing the region of interest using a secure registry;

encrypt, encode or associate a deterrent with the data; and print the deterrent and the region of interest on an object, wherein the deterrent and the region of interest are separate indicia printed at different locations on the object.

8. The system as defined in claim 7, wherein the data is selected from the region of interest data, scan settings, imaging settings secure registry settings, job settings, and combinations thereof, and wherein the region of interest data includes region of interest location data, region of interest glyph specification data, and combinations thereof.

9. The method as defined in claim 7, the program is to direct the computing device to:

segmenting the deterrent;

extract the data using the deterrent;

obtain the region of interest based on the extracted data; and perform an image based forensic analysis of the obtained region of interest based on the data.

10. The method as defined in claim 9 wherein obtaining the region of interest is accomplished by capturing, via an electronic device, an image of the region of interest, and wherein the program is to send the captured image of the region of interest to the secure registry which performs the image based forensic analysis.

11. The method as defined in claim 9, the program is to direct the computing device to:

capture the deterrent via and electronic device; and transmit the captured deterrent to the secure registry, wherein the secure registry is configured to segment the deterrent and extract the data for the region of interest.

12. The method as defined in claim 9 wherein the data is selected from region of interest location data, region of interest glyph specification data, scan settings, imaging settings, secure registry settings, job settings, and combinations thereof.

* * * * *

UNITED STATES PATENT AND TRADEMARK OFFICE
CERTIFICATE OF CORRECTION

PATENT NO.        : 8,532,330 B2                                    Page 1 of 1
APPLICATION NO.   : 12/992874
DATED             : September 10, 2013
INVENTOR(S)       : Steven J. Simske et al.

It is certified that error appears in the above-identified patent and that said Letters Patent is hereby corrected as shown below:

In The Claims

In column 7, line 22, in Claim 8, delete "from the" and insert -- from --, therefor.

In column 7, line 23, in Claim 8, delete "settings" and insert -- settings, --, therefor.

In column 8, line 1, in Claim 9, delete "method" and insert -- system --, therefor.

In column 8, line 3, in Claim 9, delete "segmenting" and insert -- segment --, therefor.

In column 8, line 9, in Claim 10, delete "method" and insert -- system --, therefor.

In column 8, line 9, in Claim 10, delete "9 wherein" and insert -- 9, wherein --, therefor.

In column 8, line 15, in Claim 11, delete "method" and insert -- system --, therefor.

In column 8, line 17, in Claim 11, delete "and" and insert -- an --, therefor.

In column 8, line 21, in Claim 12, delete "method" and insert -- system --, therefor.

In column 8, line 21, in Claim 12, delete "9 wherein" and insert -- 9, wherein --, therefor.

Signed and Sealed this
Eighth Day of December, 2015

Michelle K. Lee
*Director of the United States Patent and Trademark Office*